UNITED STATES PATENT OFFICE.

JOHN CRAWFORD, OF CANAAN FOUR CORNERS, NEW YORK, ASSIGNOR TO FREDERICK C. BOSTWICK, OF SAME PLACE.

PROCESS OF MAKING TOBACCO-BROWN WRAPPING-PAPER.

SPECIFICATION forming part of Letters Patent No. 653,411, dated July 10, 1900.

Application filed April 18, 1900. Serial No. 13,287. (No specimens.)

*To all whom it may concern:*

Be it known that I, JOHN CRAWFORD, a citizen of the United States, residing at Canaan Four Corners, in the county of Columbia and State of New York, have invented new and useful Improvements in Processes of Making Tobacco-Brown Wrapping-Paper, of which the following is a specification.

This invention relates to the process of producing tobacco-brown wrapping-paper by means of catechu of commerce, copperas, blue vitriol, tobacco-dust, and pulp made from mixed straw and tobacco-stems, as hereinafter described, and has for its object to produce a strong wrapping-paper of tobacco color which will not be liable to change in shade when exposed to air or light and be free from deleterious substances and be produced at moderate expense.

In the practice of my process I proceed as follows: I take any preferred quantity, by weight, of straw of any grain, say seven thousand (7,000) pounds, and introduce the same into the usual bleach-tub (used by paper-makers for treating straw) with about sixteen hundred (1,600) pounds of unslaked lime and a suitable quantity of water and cook this charge in the manner usually practiced by the trade about twelve (12) hours. I also, in a similar bleach-tub, cook for a substance for mixture with said cooked quantity of straw about fourteen hundred (1,400) pounds of tobacco-stems with about three hundred (300) pounds of lime and a suitable quantity of water for about five hours. These quantities of straw and tobacco-stems, which are in proportion, by weight, of five parts of straw and one part of tobacco-stems, when cooked, as above described, produce as their products the fibrous substances which when mixed and beaten form the pulp for the body of the paper to be produced. These separately and differently (as to time) cooked substances are now run through a washer and are thoroughly washed and cleared from lime. In the same proportion the straw product, five parts, and tobacco-stem product in one part, mixed together, are introduced into a suitable beating-machine, when the charge is beaten for about four (4) hours. After the finish of this first beating of this straw and tobacco-stem mixture I introduce a color solution consisting of catechu of commerce four (4) gallons, dissolved in about ten gallons of water and reduced to a thin liquid condition by steam in proportion to every five hundred (500) pounds of the beaten pulp mixture, which color solution is introduced into the combined straw and tobacco-stem mass of pulp while the latter is in the beater, and the beater is run, beating up the charge as before, until the pulp mixture has been thoroughly colored by the catechu of this coloring solution. I now introduce separately into the pulp set solutions comprising the following ingredients in proportion to each five hundred (500) pounds of mixed pulp mass, to wit: for a solution for each five hundred pounds of the mixed and colored pulp, copperas one-quarter ($\frac{1}{4}$) pound dissolved in six quarts of heated water, and blue vitriol two (2) pounds, also dissolved in about six quarts of heated water. These solutions—copperas ($FeSO_4 7H_2O$) and blue vitriol ($CuSO_4$)—are separately introduced into the catechu-colored pulp while the beater is running, and when both these solutions have been well or thoroughly introduced and assimilated with the colored pulp I add about twenty-five (25) pounds of tobacco-dust to each charge of the pulp. This mass is now subjected to the action of the beater for about four (4) hours, when the mass will be found to be ready to be run to the stuff-chest. From the stuff-chest this colored product will now be pumped to a leader running into a suitable vat, with which is connected a second leader conveying water into the same vat containing the pulp to be washed, bathed, and thoroughly cleansed until the water running therefrom will be clear and free from all foreign substance. This cleansed pulp will now be run over an ordinary cylinder-machine and come from it in the form of a web of any preferred weight or thickness suitable for use for wrappers for tobacco in any form wrappers are used with it, and the color of this product will be that of a tobacco-brown, (medium color.)

It is to be understood that a darker tobacco-brown may be given to the product by increasing the catechu to a small percentage, while a lighter tobacco-brown color may be produced by lessening the quantity of catechu by a small percentage.

What I claim as my invention, and desire to secure by Letters Patent, is—

The process of producing tobacco-brown wrapping-paper described, the same consisting in subjecting, separately straw of grain and tobacco-stems, in proportions, by weight as described, to the actions of separate cookings with unslaked lime in proportion and for respectively different lengths of time and thoroughly cleansing these differently-cooked products mixing these products and beating the mixed products to a pulpy condition, then incorporating with the pulp charge catechu coloring solution described, and following the same by copperas and blue-vitriol solutions and tobacco-dust, each separately as described and subjecting the now-completed pulp charge to further beating, as described, and then thoroughly washing and cleansing the now-colored pulp product and spreading the same into a web to form paper, all substantially as herein set forth.

In testimony whereof I have signed my name to this specification in the presence of two subscribing witnesses.

JOHN CRAWFORD.

Witnesses:
HIRAM S. JOHNSON,
ROLLAND C. DROWNE.